United States Patent [19]

Williams

[11] Patent Number: 5,385,339
[45] Date of Patent: Jan. 31, 1995

[54] SET-UP JIG FOR TRUSS TABLE

[75] Inventor: Thomas H. Williams, Edenton, N.C.

[73] Assignee: Tee-Lok Corporation, Edenton, N.C.

[21] Appl. No.: 70,556

[22] Filed: Jun. 1, 1993

[51] Int. Cl.⁶ .............................................. B25B 1/20
[52] U.S. Cl. ..................................... 269/37; 269/303; 269/304; 269/307; 269/315; 269/910; 29/281.3
[58] Field of Search ..................... 83/468, 802, 522.11, 83/522.17, 522.18; 269/307, 910, 303–305, 315, 319, 37; 100/913; 29/281.1, 281.3

[56] References Cited

U.S. PATENT DOCUMENTS

| | | |
|---|---|---|
| 2,212,421 | 8/1940 | Henderson . |
| 2,919,733 | 1/1960 | Johnson . |
| 2,983,292 | 5/1961 | McKinley . |
| 3,299,920 | 1/1967 | Koenigshof . |
| 3,421,751 | 1/1969 | Menge . |
| 3,667,379 | 6/1972 | Templin . |
| 4,453,705 | 6/1984 | McDonald . |
| 4,819,475 | 4/1989 | Irvello ............................. 83/522.18 |
| 4,943,038 | 7/1990 | Harnden . |
| 5,085,414 | 2/1992 | Weaver . |
| 5,092,028 | 3/1992 | Harnden . |

Primary Examiner—Robert C. Watson
Attorney, Agent, or Firm—Bell Seltzer Park & Gibson

[57] ABSTRACT

A set-up jig for a truss table is disclosed. The jig comprises (a) a body portion having a recessed portion on its lower surface configured to receive and slide upon a rail and further including a securing aperture and (b) stop means for constraining the movement of truss planks. A truss table suitable for use with such jigs is also disclosed.

18 Claims, 3 Drawing Sheets

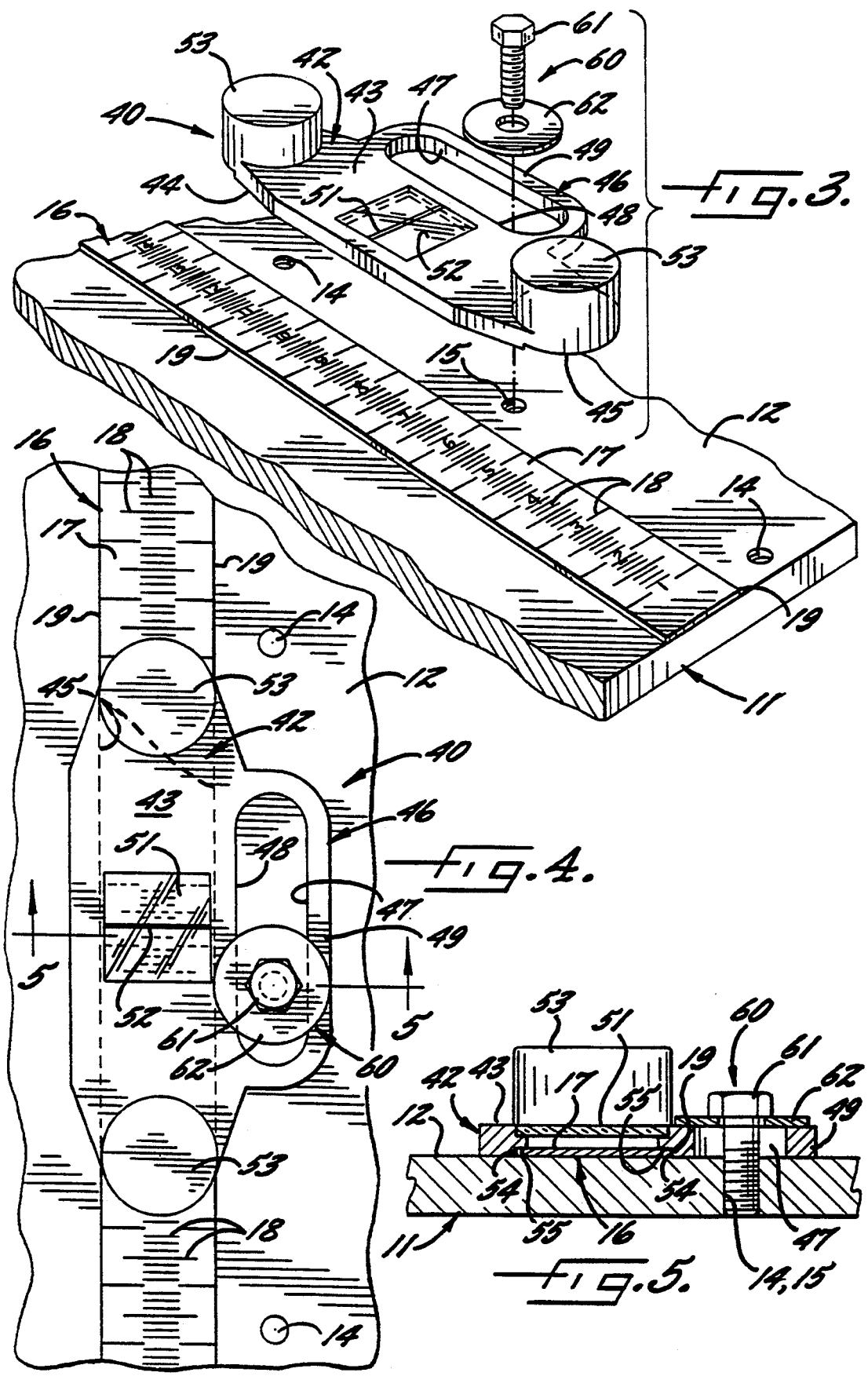

SET-UP JIG FOR TRUSS TABLE

FIELD OF THE INVENTION

This invention relates generally to a set-up jig for a truss table, and more particularly relates to a set-up jig that rests and glides on the table surface of a truss table.

BACKGROUND OF THE INVENTION

Trusses for the roof and floor of a dwelling comprise a series of lumber planks arranged in a triangulated pattern. Truss design varies from house to house because of consumer demand for individualized home design, but within a single home generally several trusses of identical configuration will be used.

The most time-consuming task of truss construction is the "set-up", which is the placement of locator stops on a truss table into positions in which they force truss planks into the proper position and orientation for subsequent attachment. Each set of planks is precut to the proper length and angle, but must be arranged on a truss table in the correct triangulated truss configuration prior to being fixed into that configuration with truss plates.

Set-up jigs are used to hasten the set-up process. They are quickly positioned on the truss table to indicate the proper placement of planks on the table. The planks are then arranged on the table, with their positions and relative orientations being defined by the placement of the set-up jigs. Semi-permanent locator stops are then placed around the planks based on the location of the planks. Generally, the truss table will include a grid of apertures which receive pins that secure the locator stops. These locator stops are considerably larger than the set-up jigs and are capable of fine translatory and angular adjustment so that pressure can be applied virtually anywhere on the planks to assure consistency between trusses.

Once the locator stops are properly positioned, the planks are attached to one another by a pressure roller which presses an attachment plate into adjoining planks to form the truss. The truss so formed is removed, and another set of planks is guided into position within the locators stops. The locator stops remain in place until all trusses of the selected configuration have been formed. They are then removed, and the set-up jigs are once again placed on the table to quickly define the configuration for the next truss configuration.

Set-up jigs in a variety of configurations are known. For example, U.S. Pat. No. 5,085,414 to Weaver discloses a jig for forming trusses which includes a block designed to fit within the rails of a C-channel sunk into and extending across the width of the table surface of a truss table. The jig can be moved along the length of the C-channel and fixed into an appropriate location through a disk-shaped stop attached to the aforementioned block. Also disclosed are a scale which fits atop and extends along the length of one of the C-channel rails and an indexing means associated with the scale to provide the operator with a reference point for positioning the jig during set-up. Another exemplary set-up jig configuration is shown in U.S. Pat. No. 4,493,038 to Harnden, which discloses a truss assembly apparatus which includes a jig positioned upon a worm gear located within a C-channel. Rotation of the worm gear causes the jig to slide within the C-channel to the desired location for set-up.

Each of these C-channel-based configurations requires that the C-channel be recessed into the table surface so that the top lips of the C-channel are level with the table surface. Although this configuration is suitable for wooden-topped truss tables, it is not suitable for the newer, more preferred steel-topped tables. The table surface of a steel-topped table has a relatively thin depth profile and is preferably provided to the operator as a single slab; each of these factors precludes the sinking of a C-channel therein. Further, the requirement that the C-channel be recessed in the table precludes moving the C-channels to different locations on the table.

In addition, the top lips of the C-channel of Weaver and the teeth of the worm gear of Harnden are prone to permanently deflect when under stress. Such stress often occurs when slightly warped planks are bent and forced into place after the set-up jigs are positioned. The forces exerted on the stops of the jigs by the deflected planks can easily be of sufficient magnitude to cause the lips of the C-channel and the worm gear teeth to deform permanently. The deformation can be sufficiently great that the jig contained therein can no longer move freely within the C-channel, and thus is no longer usable.

Accordingly, it is a first object of the present invention to provide a set-up jig suitable for use with a steel-topped truss table.

It is a second object of the present invention to provide a truss table employing such a set-up jig.

It is a third object of the present invention to provide a set-up jig and table combination that can withstand the rigors of the set-up and the truss formation operations over time despite the use of slightly warped truss planks.

SUMMARY OF THE INVENTION

These and other objects are satisfied by the present invention, which as a first aspect includes a set-up jig for assisting in the formation of trusses comprising (a) a body portion having a top surface and a substantially planar lower surface, and (b) stop means attached to the body portion adapted for constraining the movement of truss planks. The lower surface of the body portion includes a recessed channel configured to receive and slide upon a rail. The body portion further includes an aperture configured to receive means for securing the jig in a predetermined position on a truss table.

A second aspect of the present invention is a truss table suitable for use with such a set-up jig.

BRIEF DESCRIPTION OF THE FIGURES

FIG. 3 is an exploded perspective view of a set-up jig, a scaled rail, and the surface of a steel-topped table.

FIG. 4 is a top view of a set-up jig in place nested upon a scaled rail attached to a steel-topped table.

FIG. 5 is a cross-sectional view taken along line 4—4 of FIG. 4 and showing the relative positions of the viewing window, the recessed channel, and the rail. Also shown is the threaded fastener inserted through the securing aperture and into a table aperture, particulars of the jig carried thereby and the manner in which the jig is attached to a steel-topped table, adjacent portions of which are shown in fragmentary form.

DETAILED DESCRIPTION OF THE INVENTION

The present invention will now be described in greater detail hereinafter. The illustrated embodiment is not intended to be limiting; rather, it is included herein to provide a more complete understanding of the invention to those skilled in this art.

Figure 1:
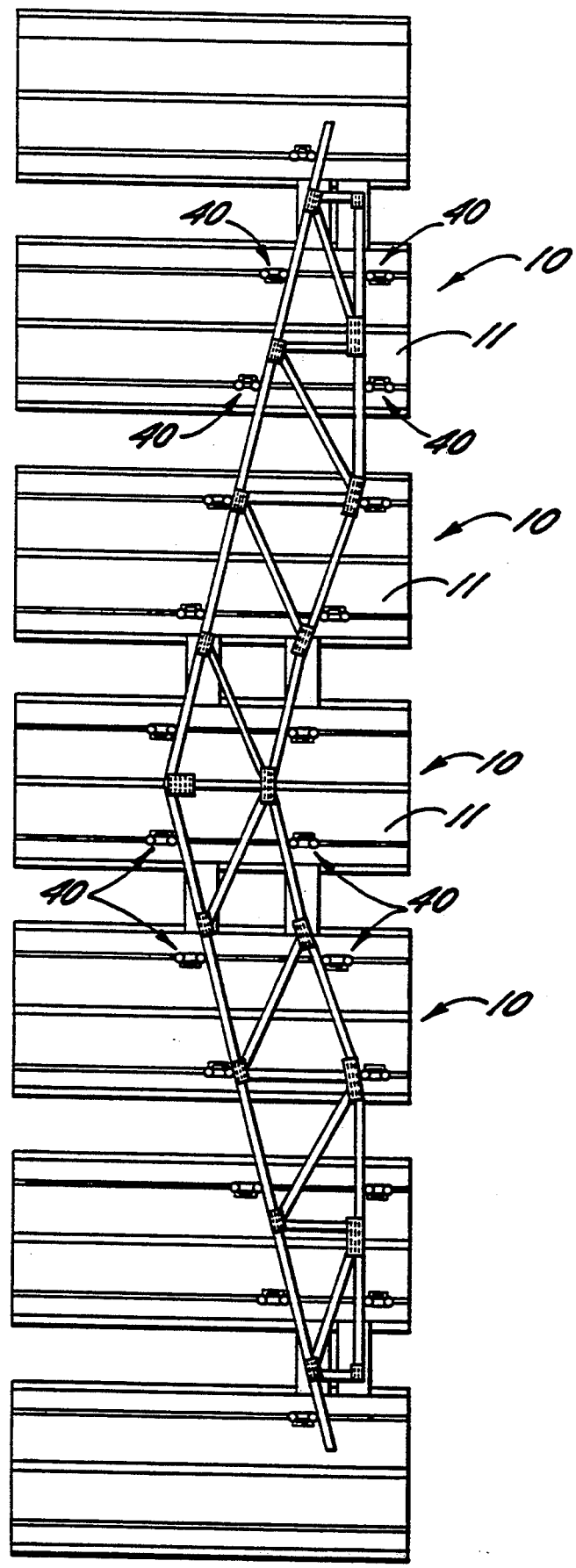
FIG. 1 is a plan view of a truss table series with jigs located for defining a triangulated truss configuration.

Referring now to the drawings, FIG. 1 illustrates a series of rectangular-top truss tables, each of which is designated broadly at 10. Each table 10 has a rectangular top 11 and a plurality of set-up jigs 40. In the discussion that follows, reference will be made to the location, orientation, and movement of certain structures of the truss table relative to other structures. As used herein, "front" and "rear" refer to the opposing directions parallel to the length, or longer dimension, of the rectangular top 11 of each table 10; "front" denotes the direction toward the right edge of the page in FIGS. 1 and 2, and "rear" denotes the direction toward the left edge of the page in FIGS. 1 and 2. It will be understood by those skilled in this art that these directions are defined herein for clarity and that each could be reversed without impacting the present invention. The term "lateral" refers to either direction that is parallel with the rectangular top 11 and perpendicular to "front" and "rear" as defined above; thus "lateral" is parallel with the width, or shorter, dimension of the rectangular top 11. Those skilled in this art will appreciate that although a conventional rectangular top 11 is illustrated herein, any table top that is sufficient in size to support the truss planks as they are arranged and joined into the desired truss configuration, such as square, oval, and the like, is suitable for use with this invention. In general, it is preferred that the table top 11 be formed of steel, as steel-topped tables are generally more rigid and durable than wooden-topped models, but those skilled in this art will appreciate that the table top 11 can be formed of virtually any material that is sufficiently hardy to withstand the weight, pounding, and pressure to which it is exposed during the process of truss formation.

Figure 2:
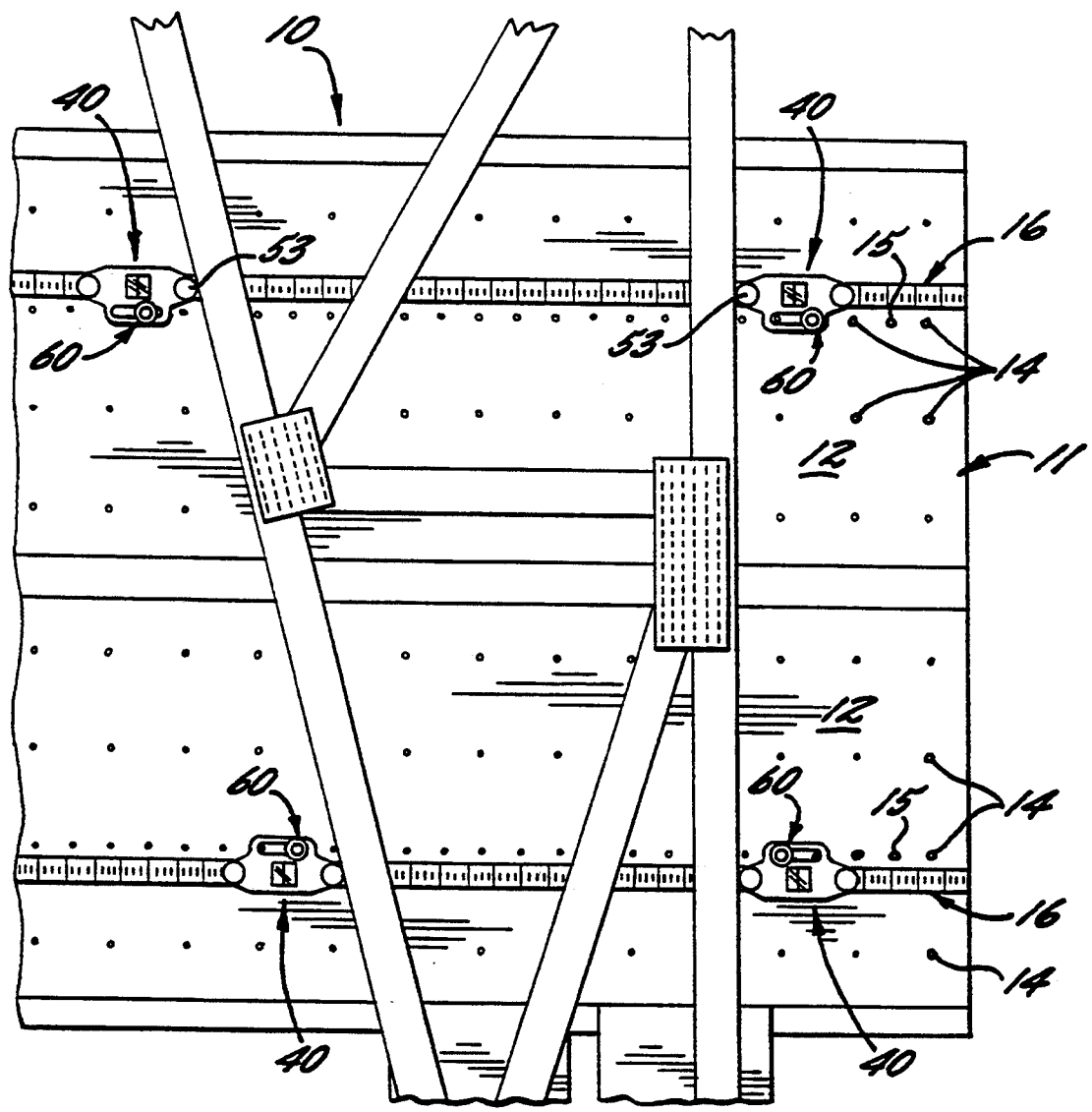
FIG. 2 is an enlarged view of the table surface of a truss table and set-up jigs positioned thereon.

The rectangular top 11 includes an upper table surface 12 having a plurality of securing apertures 14 that extend into the table top 11 perpendicularly to the table surface 12. These apertures 14 are arranged in a 6 inch × 6 inch square grid pattern, with columns of apertures 14 extending from the front of the table to the rear and rows of apertures 14 extending laterally. This array is typical for truss table surfaces, but any number of aperture arrays would be suitable for use with the present invention. As seen in FIG. 2, columns of apertures 14 adjacent rails 16 include additional apertures 15 positioned between each of the apertures 14 of the grid pattern so that in these columns, apertures are separated by three inches. The apertures 14 and 15 are round, threaded and sized in diameter and depth to receive and immobilize a securing threaded fastener.

A plurality of shallow indexed rails 16 rest upon and are fixed to the table surface 12 to extend lengthwise from the front edge of the table surface 12 to the rear edge. Each rail 16 is adhesively fixed on the table surface 12 to reside between two columns of apertures 14; it is preferred that the rails 16 be detachable for movement to a more advantageous position on the table surface 12 if desired. In this embodiment, each rail 16 measures 2 inches laterally and has lateral walls 19 1/16 inch in height; thus the upper surface 17 of each rail 16 projects 1/16 inch above the table surface 12. Neither of these dimensions is critical; the lateral dimensions should be sufficiently small that the rail 16 can reside between columns of apertures 14 without covering any portion thereof, and the height dimension should be chosen to be sufficiently small, such as between 1/32 and ⅛ inch, that the placement of truss planks on the table surface 12 is not adversely affected by the rails 16. More importantly, both the height and lateral dimensions of the rail 16 should be chosen so that the rail 16 slidably mates with a set-up jig 40. Each rail 16 includes on its upper surface 17 a set of indexing marks 18 that indicate the distance from the edges of the table surface 12 to specific locations on the rail 16.

Also shown in FIG. 2 are a plurality of set-up jigs 40, each of which slidably mates with one of the rails 16 and is attached to the table surface 12 with a securing unit 60. As each of these set-up jigs 40 is identical, in the interest of brevity and clarity only one will be described herein; those skilled in this art will appreciate that the description is equally applicable to the other jigs.

The set-up jig 40 (FIGS. 3 and 4) comprises a body portion 42 and a pair of disk-shaped stops 53. The body portion 42 is substantially oblong and includes a top surface 43 and a substantially planar lower surface 44. Those skilled in this art will appreciate that, although an oblong body portion is illustrated herein, any shape for the body portion that unifies the movement of the stops 53, the structures of the lower surface 44 described below, and the lateral arm 46 is suitable for use with the present invention.

The lower surface 44 includes a recessed channel 45 (FIG. 4) of rectangular profile having lateral walls 54 and an upper surface 55. The recessed channel 45 is sized and configured to receive and slide upon the upper surface 17 of one of the rails 16 the lateral movement of the jig 40 being constrained by contact between the lateral walls 19 of the rail 16 and the lateral walls 54 of the channel 45. Preferably, the channel 45 is sized so that as the upper surface 55 of the channel 45 rests on the upper surface 17 of a rail 16, the lower surfaces 44 of the body portion 42 also rest on the portions of the table surface 12 adjacent the rail 16; this reduces the tendency of the jig 40 to twist about the length of the rail 16. It is preferred that the corners of the channel between the upper surface 55 and the lateral walls 54 be sharp (i.e., have a radius of essentially zero) in order to minimize any lateral movement of the jig 40 on the rail 16; similarly, the corners between the lateral walls 54 and the lower surface 44 are also preferably sharp.

The body portion 42 further includes a elongated C-shaped lateral arm 46 (FIG. 4) that is attached at either end to a lateral edge 48 of the body portion 42. The central portion 49 of the lateral arm 46 is spaced from and extends substantially parallel to the lateral edge 48, thereby forming therebetween an elongated oblong aperture 47. The recessed channel 45, the lateral edge 48, and the lateral arm 46 are configured so that as the channel 45 rests upon the rail 16, the aperture 47 resides directly above a column of apertures 14 to permit access thereto to a securing unit 60. The illustrated elongated C-shape of the arm 46 is preferred, as in this configuration truss planks contacting one of the stops 53 are unlikely to also contact the arm 46, and thus interference with truss placement by the arm 46 is virtually eliminated. In the illustrated embodiment, the aperture 47 measures 4.75 inches from front to rear and 1.25 inches laterally. The lateral dimension is not critical and is selected to be sufficiently large to permit insertion into a securing unit 60. The front-to-rear dimension is preferably selected to be at least slightly greater than one-half of the distance between adjacent apertures 14 located in the same column; as the typical truss table includes apertures separated on 3-inch centers, it is preferred that the aperture 47 measure at least slightly more than 3 inches from front to rear. With this length dimension, it is possible to position the stops 53 of the jig 40 anywhere along the expanse of the rail 16 and still access and secure the jig 40 to one of the column of apertures 14 present beneath the aperture 47. Further, it is preferred that the lateral edge 48 be between about ¼ and ¾ inch from the nearest lateral wall 54.

In the center portion of the body portion 42 is a viewing window 51 positioned above the recessed channel 45 to allow the operator to observe the indexing marks 18 of a rail 16 and thereby determine the position of the jig 40 relative to the rail 16. The viewing window 51 includes laterally-extending indexing marks 52 to be aligned with a predetermined indexing mark 18 of the rail 16.

The stops 53 project upwardly from the top surface 43 of the body portion 42 to provide guides that define the proper positioning for truss planks. The stops 53 are illustrated herein in the preferred disk-shaped form, but can be of any configuration, such as square, rectangular, hexagonal, octagonal, oval, and the like, that provides a structure that can constrain the horizontal movement of a truss plank in contacting relation therewith. Preferably the stops project upwardly at least 1 inch, and more preferably at least 1.25 inches, above the table surface 12. A pair of stops 53 positioned on opposite ends of the body portion 42 as illustrated herein is preferred, as this configuration permits the use of a pair of identical jigs 40 simultaneously on the top chord and the lower chord of a particular truss design (FIG. 2). Also, the dual-stop design allows the jig 40 be placed on the table 10 so that the aperture 47 can face in either lateral direction (FIG. 2). This capability permits the operator to place the rail 16 on the side of a column of apertures 14 that most advantageously positions the jig 40 for use.

Preferably, the body portion 42 and the stops 53 of the jig 40 are integrally formed of stainless steel. A jig so formed can withstand the rigors of both the set-up and truss formation operations without permanently deforming and thus being rendered unusable. However, those skilled in this art will recognize that other materials, such as aluminum, copper, iron, and the like, may be used as the jig material for either or both of these operations under certain conditions.

The jig 40 is secured to the table top 11 by a securing unit 60 which comprises a hex-head threaded fastener 61 and a flat washer 62, the diameter of which exceeds the width of the aperture 47. The threaded fastener 61 is sized to be threadedly received by one of the plurality of apertures 14 or 15 on the table surface 12. Those skilled in this art will appreciate that any means for securing the jig 40 to the table surface 12, such as press-fit pins, and the like, that can be inserted through the aperture 47 into one of the apertures 14 and withstand the forces applied to it during operation is suitable for use with the present invention.

The set-up operation begins with the placement of each jig 40 on a rail 16 so that the lower surface 44 rests upon the portion of the table surface 12 adjacent the rail 16, the upper surface 55 of the recessed channel 45 rests upon the upper surface 17 of the rail 16, and the lateral walls 54 of the recessed channel 45 contact the lateral edges 19 of the rail 16. Information for a specific truss design that relates the proper positioning of each jig 40 on each rail 16 for that design is then obtained; this information can be calculated by hand or can be provided by a computer program that determines the proper positions of truss members relative to the edges of the table surface 12 for a particular lateral position, than applies that information to provide precise positions for set-up jigs 40. Each jig 40 is guided along its rail 16, with the contact between the lateral walls 54 of the recessed channel 45 constraining the jig 40 laterally, until observation through the viewing window 51 indicates that the indexing marks 52 are aligned relative to the indexing marks 18 of the rail 16 indicated by calculations to be proper. At this point the stops 53 are correctly positioned for arrangement of the truss planks. The threaded fastener 61 of the securing unit 60 is then inserted through the washer 62, through the aperture 47, and into an accessible aperture 14, and then is tightened to secure the jig 40 to the table surface 12.

After all of the jigs 40 have been positioned and secured, the truss planks are arranged in their proper configuration. After the planks are arranged, typically permanent jigs are positioned and secured around the planks using the apertures 14 and securing pins. These permanent jigs then serve as guides for sets of truss planks manufactured into trusses; thus the set-up jigs 40 can be removed. Those skilled in this art will understand that the set-up jigs 40 can also serve as locator stops if desired.

It will be appreciated that a distinct advantage of the present invention over the prior art is the capability of detaching the rails 16 and repositioning them in a more advantageous location on the table surface 12. This may be appropriate for certain truss designs or certain workspaces. It will also be appreciated that the flat profile of the rails 16 makes the use of this invention particularly suitable for steel-topped and other truss tables in which the recessing of alignment channels for set-up jigs is either impossible, difficult, or undesirable. Moreover, the set-up jig 40 can be easily moved from rail to rail if the truss design so requires, thereby providing manufacturing flexibility.

The embodiment illustrated and described above discloses a typical embodiment of the invention and, although specific terms are employed, they are used in a generic and descriptive sense only and not for the purposes of limitation, the scope of the invention being set forth in the following claims.

That which is claimed is:

1. A set-up jig for assisting in the formation of trusses comprising:
    (a) a body portion having a top surface and a substantially planar lower surface, said lower surface being divided into two substantially coplanar lateral portions having a recessed channel positioned therebetween said channel being configured to receive and slide upon a rail, said body portion further including an aperture configured to receive means for securing said jig in a predetermined position on a truss table; and
    (b) stop means attached to said body portion and adapted for restricting the movement of truss planks.

2. A set-up jig according to claim 1, wherein said body portion further comprises a viewing aperture.

3. A set-up jig according to claim 2, wherein said viewing aperture is located directly above said recessed channel.

4. A set-up jig according to claim 1, wherein said securing aperture is positioned laterally from said recessed channel.

5. A set-up jig according to claim 1, wherein one of said body portion lateral portions further comprises a lateral edge, said lateral edge being substantially parallel to said recessed channel, and a lateral arm attached at either end to said lateral edge, said lateral arm having a center portion spaced from and substantially parallel to said lateral edge, wherein said lateral edge and said lateral arm together define said securing aperture.

6. A set-up jig according to claim 5, wherein said securing aperture is sized so that the dimension substantially parallel to said recessed channel is at least 3 inches.

7. A set-up jig according to claim 6, wherein said securing aperture is an elongated slot.

8. A set-up jig according to claim 1, wherein said stop means comprises a pair of disks positioned at opposite ends of said body portion substantially above said recessed channel.

9. A set-up jig according to claim 1, wherein said recessed channel includes an upper surface, and wherein said upper surface is recessed between about 1/32 and ⅛ inch from said lower surface of said body portion.

10. A set-up jig according to claim 5, wherein said recessed channel comprises a pair of lateral walls and wherein said lateral edge is between about ¼ and ¾ inch from one of said pair of lateral walls.

11. A set-up jig according to claim 1 further comprising securing means adapted to secure said jig to a table surface.

12. A table for the construction of trusses comprising:
(a) a table including a generally horizontal table surface, said table including a plurality of apertures arranged in an array of columns and rows;
(b) a plurality of rails fixed to and extending across the width of said table surface substantially parallel to said columns of said table surface; and
(c) a plurality of set-up jigs, each of said jigs comprising:
(i) a body portion having a top surface and a substantially planar lower surface, said lower surface being divided into two substantially coplanar lateral portions having a recessed channel positioned therebetween said channel being configured to receive and slide upon one of said plurality of rails, said body portion further including an aperture configured to receive means for securing said jig into one of said plurality of table apertures so that said jig can be secured in a predetermined position on said table surface;
(ii) stop means attached to said body portion adapted for restricting the movement of truss planks being positioned on said table surface; and
(iii) securing means for fastening said jigs to said table surface, said securing means being configured to be inserted through said aperture of said body portion and received by one of said apertures of said table surfaces.

13. A truss table according to claim 12, wherein said rail includes an indexing scale, and wherein said body portion of said set-up jig further includes a viewing aperture positioned above said recessed channel.

14. A truss table according to claim 12, wherein said table surface is formed of steel.

15. A truss table according to claim 12, wherein said recessed channel includes an upper surface, and wherein said upper surface is recessed between about 1/32 and ⅛ inch from said lower surface of said body portion.

16. A set-up jig according to claim 12, wherein one of said body portion lateral portions further comprises a lateral edge, said lateral edge being substantially parallel to said recessed channel, and a lateral arm attached at either end to said lateral edge, said lateral arm having a center portion spaced from and substantially parallel to said lateral edge, wherein said lateral edge and said lateral arm together define said securing aperture.

17. A set-up jig according to claim 16, wherein said recessed channel comprises a pair of lateral walls and wherein said lateral edge is between about ¼ and ¾ inch from one of said pair of lateral walls.

18. A set-up jig for assisting in the formation of trusses comprising:
(a) a body portion having a top surface and a substantially planar lower surface, said lower surface including a recessed channel, said channel being configured to receive and slide upon a rail, said body portion further including an aperture configured to receive means for securing said jig in a predetermined position on a truss table; and
(b) stop means attached to said body portion and adapted for restricting the movement of truss planks, said stop means comprising a pair of disks positioned at opposite ends of said body portion substantially above said recessed channel.

* * * * *